United States Patent [19]

Paleschuck

[11] 4,444,099
[45] Apr. 24, 1984

[54] AIRBORNE REFUSE COMPACTOR

[76] Inventor: Maurice Paleschuck, 140 Redwood Dr., Roslyn, N.Y. 11576

[21] Appl. No.: 419,741

[22] Filed: Sep. 20, 1982

[51] Int. Cl.³ .............................................. B30B 9/04
[52] U.S. Cl. ............................... 100/127; 100/229 A; 100/255; 100/269 R; 100/295; 244/1 R
[58] Field of Search ................. 244/118.5, 129.1, 1 R; 220/1 T; 100/269 R, 229 A, 265, 295, 240, 245, 220/104, 90, 255, 107, 126, 127

[56] References Cited

U.S. PATENT DOCUMENTS

| 293,335 | 2/1884 | Knapp | 100/269 R |
|---|---|---|---|
| 1,703,783 | 2/1929 | Schmidt | 100/265 X |
| 3,654,855 | 4/1972 | Longo | 100/269 R X |
| 3,835,767 | 9/1974 | Peterson | 100/295 X |
| 3,835,769 | 9/1974 | Peterson | 100/295 X |
| 3,899,967 | 8/1975 | Powers | 100/269 R |
| 4,070,962 | 1/1978 | Peterson | 100/269 R X |
| 4,183,295 | 1/1980 | Peterson | 100/295 X |

Primary Examiner—Billy J. Wilhite
Attorney, Agent, or Firm—Leonard Belkin

[57] ABSTRACT

An airborne refuse compactor to compact liquid laden trash for storage until the end of the flight. The compactor relies on the difference between pressure within the pressurized passenger cabin and outside pressure at operating altitude. The compactor also discharges to outside atmosphere liquid which has collected on the bottom of the receptacle in which the trash is collected. Liquid is discharged while compaction is taking place.

11 Claims, 8 Drawing Figures

AIRBORNE REFUSE COMPACTOR

BACKGROUND OF THE INVENTION

This invention relates to an airborne refuse compactor and more particularly to a refuse compactor employed in the pressurized cabin of an aircraft, relying on such pressurization to effect the operation of the compactor.

Capacity of passenger aircraft has increased dramatically over the past thirty years. It is not unusual for some airlines to be equipped to carry a passenger load in excess of five hundred persons, whereas loads in excess of a hundred passengers are a common occurrence, perhaps as many as thousands of flights a day throughout this country and the rest of the world.

While many flights are short in duration, three or four hours or less, in which only snacks may be served, many flights are of sufficient duration as to require the service of at least one meal to each of the passengers. On other flights, regional, coast to coast, and international in nature, two or more meals and/or snacks may be served. In addition, much of the equipment used in meal service is made from paper or plastic material designed to be discarded as part of the trash, refuse or garbage resulting from such service.

At the present time, such refuse is generally collected in plastic bags and stored aboard the aircraft until the flight terminates at which time they are removed for disposal. These bags are bulky and at the very least they represent an inconvenience to the crew and passengers as they become filled and their numbers accumulate during the course of the flight.

On lengthy flights, with large passenger loads, especially when there are multiple servings of food, the problem does become acute, so much so that it is not unusual for one or more of the multiple lavatories aboard to be used as rooms for the storage of the bags. This of course results in further inconvenience for those aboard the aircraft. The net effect is that valuable space aboard such a vehicle must be dedicated for such use.

One way of dealing with this problem is to provide a compactor aboard the aircraft to reduce the volume of the refuse which must be stored. The operation of such a device, however, does present certain problems which have not yet been adequately overcome. In addition to space, weight is also an important factor. Electric power for actuating such a device requires that the electrical system of the plane be redesigned to accommodate the tremendous power drain due to such a load. In addition, the compactor itself, employing one or more electric motors and mechanical devices for effecting the compressing action which are bulky and heavy, must be accommodated.

The use of a hydraulic system has been proposed, but this requires additional plumbing and heavy hydraulic equipment to operate the compactor.

The current state of the art is illustrated by several patents dealing with trash compactors. In U.S. Pat. No. 3,654,855 there is provided a unit which utilizes household water to operate a hydraulic ram to obtain the force necessary to compact the refuse. U.S. Pat. Nos. 3,835,767, 3,835,769, 3,899,967, 4,070,962, and 4,183,295 all utilize air pressure to obtain compaction but rely on pumps of one type or another to produce the vacuum necessary to have the devices function. In the first two Peterson patents, springs are employed to retract the pressure plate after compaction. The Powers patent relies apparently on wall stiffness to return the container to its expanded state. The third and fourth Peterson patents are double-acting but use pivoted pressure plates and are designed to be emptied by trash collection vehicles equipped with handling apparatus. None provides for the removal of liquid content of the trash, and some do not have disposable receptacles. They all are relatively complex devices, heavy in construction, and not suitable for use aboard an aircraft.

SUMMARY OF THE PRESENT INVENTION

The present invention overcomes many of the problems described above and makes it practical and efficient to use a compactor aboard an aircraft in which the cabin is pressurized for the comfort and safety of its passengers.

In accordance with the principles of this invention there is provided a light weight compactor in which cabin pressurization is utilized to energize the compactor. In a typical situation, the cabin may be pressurized to 14.7 psia, that is, at or near sea level, while the aircraft may be flying at an altitude of 36,000 ft. where atmospheric pressure is 3.3 psia. This difference in pressure is quite substantial and sufficient to motivate a compactor designed to incorporate the principles of this invention. In addition, such a compactor, in this invention, can include provision to discharge the liquid content of the refuse to the atmosphere, thereby further reducing the weight and space requirements of the refuse.

In accordance with the principles of this invention, in a preferred embodiment of this invention, there is provided a compactor comprising a housing with a cavity into which an open top, disposable receptacle into which refuse is deposited is inserted. A door with proper sealing controls the opening into the housing. A piston is located within the housing above the open top of the receptacle. With the door sealed shut and the receptacle therein containing refuse to be compacted, the interior of the housing below the piston is exposed through a valve arrangement to the reduced air pressure outside of the passenger cabin. The differential air pressure on the piston causes the latter to move downwardly into the receptable compressing the refuse.

The valve arrangement is then altered so that the pressure within the interior of the housing below the piston is transferred back to the pressure within the cabin, which has been maintained at or near sea level pressure, and to expose the space above the piston to the reduced air pressure outside of the cabin. This causes the piston to retract leaving the refuse within the container in a compacted state. This embodiment also incorporates a unique arrangement which permits the discharge of waste liquid within the refuse to atmosphere during compaction. After compaction, the receptacle can be removed from the housing to permit more refuse to be added, and thereafter returned for another stage of compaction and removal of liquid. To seal the receptacle which can then be disposed of, provision is made for the compactor to insert a cover which seals in the refuse.

It is thus a principal object of this invention to provide an airborne refuse compactor of simple, lightweight design which utilizes cabin pressurization to compact collected refuse and remove liquid contained therein.

Another object of this invention is to provide an apparatus for utilizing cabin pressurization within an aircraft to compact refuse and to remove liquid contained within the refuse.

Other objects and advantages of this invention will hereinafter become obvious from the following description of preferred embodiments of this invention.

DESCRIPTION OF THE PREFERRED EMBODIMENTS

Figure 1:
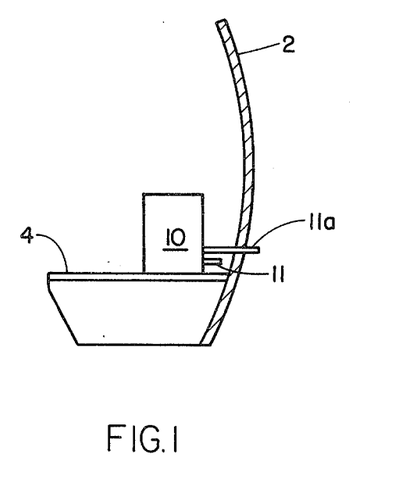
FIG. 1 illustrates the location of a compactor embodying the principles of this invention within the passenger cabin of an aircraft.

In FIG. 1 is shown a passenger cabin 2 of an airliner in which is situated compactor 10 on floor 4 of the compartment. A pair of conduits 11 and 11a extend from compactor 10. Conduit 11 terminates within cabin 2 and thus is exposed to the pressure maintained within the passenger compartment of the aircraft. Conduit 11a passes out through the wall of cabin 2, and thus is exposed to outside air pressure.

Figure 2:
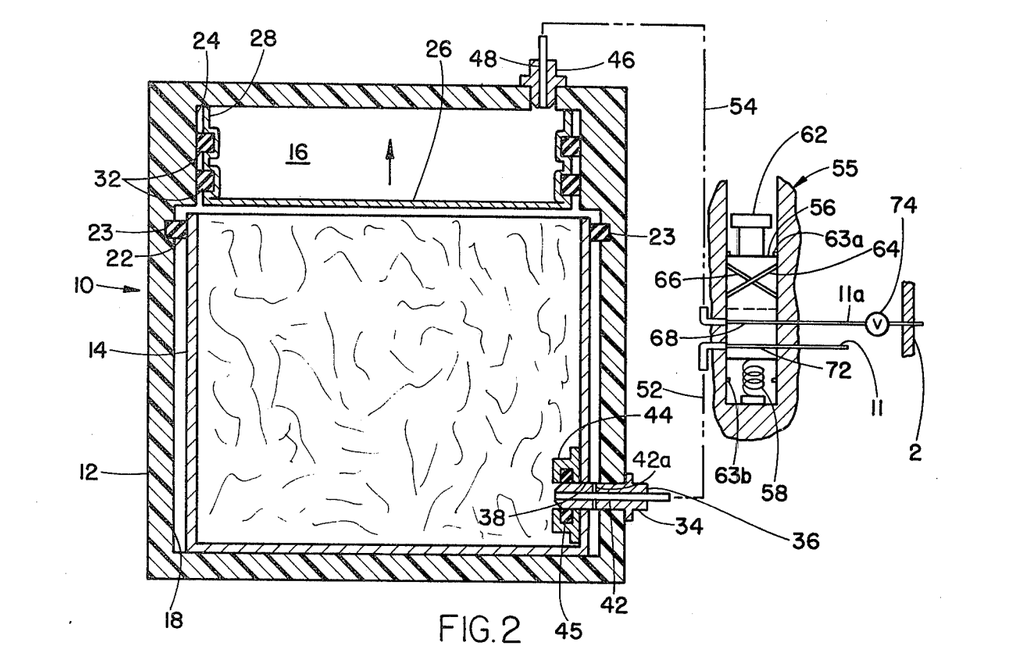
FIG. 2 is an elevation view in section of a schematic arrangement of a compactor incorporating the principles of this invention with the platen or piston retracted, and the receptacle containing refuse ready for compaction to take place.
Figure 3:
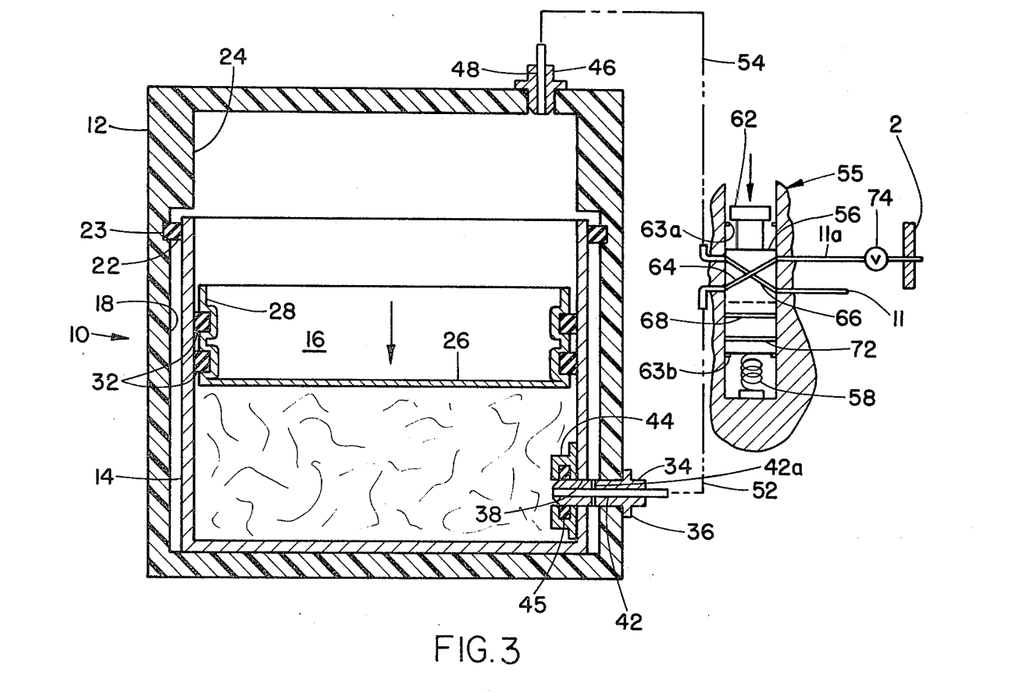
FIG. 3 is an elevation view in section of the compactor shown in FIG. 1 with the trash in the process of being compacted.

Referring to FIGS. 2 and 3, it is seen that compactor 10 consists of a housing 12 containing a refuse receptacle 14 and a slidable piston or platen 16. Housing 12, refuse receptacle 14, and platen 16, viewed from above, are rectangular in cross section.

To accommodate refuse receptacle 14, housing 12 has an interior cavity 18 with a seal or O-ring 22 mounted in a groove 23 for engaging all four sides of receptacle 14 to maintain a gas tight fit with the latter. For platen 16, housing 12 is provided with a cavity 24 with a somewhat smaller cross section than cavity 18. In fact, it will be seen that the inner surfaces of cavity 24 are aligned with the interior surfaces of refuse receptacle 14 so that when the latter is in place within its cavity 18, platen 16 can slide from its cavity 24 into receptacle 14 and back.

Platen 16 is actually shaped like a box open at the top with a bottom wall 26 serving as a piston and side walls 28. A pair of peripheral seals or O-rings 32 mounted in and running completely around the outside of walls 28 as illustrated insure that a relatively gas tight fit is maintained wherever seals 32 are making contact with receptacle 14 or the walls of cavity 24.

Housing 12 is provided adjacent the bottom thereof in one side wall with a nipple 34 attached by a flange 36 to the outside of housing 12, with the nipple extending into cavity 18 and terminating within receptacle 14 through an opening 38 provided for this purpose. Nipple 34 has a passageway 42 therethrough, in effect providing communication to the interior of receptacle 14 from the outside of housing 12. One or more openings 42a through the sidewall from passageway 42 insures that pressure outside of receptacle 14 below piston wall 26 will always be about the same.

Opening 38 is covered on the inside of receptacle 14 with a self-closing valve 44 so that when the former is removed from housing 12 opening 38 is sealed shut to prevent leakage of refuse or liquid. When receptacle 14 is inserted into housing 12, from the left, nipple 34 penetrates valve 44 to provide the communication desired. Valve 44 contains a rubber or pliable plastic donut-shaped element 45 with the hole in the center normally closed, and the action of nipple 34 is to push through, opening the hole as receptacle 14 is pushed into place within housing 12. Any other design of a valve may be employed as long as the same result is accomplished, for example, a flap biased against opening 38 could be used.

It is understood that a suitable opening (not shown in FIGS. 2 and 3) with a closure would be provided in the wall of housing 12 opposite that of nipple 34 to facilitate the insertion and removal of receptacle 14.

At some point above seal 22 in housing 12, such as in its top wall, as illustrated, a second nipple 46 with a passageway 48 therethrough is provided to obtain communication from outside of housing 12 to the interior of platen 16 above its bottom piston wall 26.

A pair of conduits 52 and 54 connected to nipples 34 and 46, respectively, lead to the inlet side of valve 55 which contains a valve body 56 biased upwardly by a spring 58. A plunger member 62 on the side away from spring 58 permits valve body 56 to be moved downwardly against spring 58. As will hereinafter be explained, valve body 56 has two positions, a normal position shown in FIG. 2 under spring biasing, and a depressed position shown in FIG. 3, compressing spring 58. Appropriate stops 63a and 63b are provided to insure proper positioning of valve body 56.

Valve body 56 contains two sets of passageways. In the upper set, passageways 64 and 66 reverse the inlet and outlet positions, while in the lower set, passageways 68 and 72 maintain the inlet and outlet positions. Passageways 64 and 66 do not communicate with each other.

Valve 55 is a device well known in the art as a four way, two position directional control valve, spring loaded and manually operated and the details of its construction do not form a part of this invention. Valves of this type are manufactured by the Automatic Valve Corporation.

Aligned with conduits 52 and 54 as they terminate within housing 55 at valve body 56 on the outlet side, are conduits 11 and 11a, respectively. A shut-off valve 74 in line 11a may be employed to closs off the line when compactor 10 is not being used.

A detent or a spring (not shown in FIGS. 2 and 3) may be used to maintain platen 16 in its upper position shown in FIG. 2 when compaction is not taking place and valve 74 is closed.

It is readily apparent from FIG. 2, with valve body 56 in its normal position, and valve 74 open, that the space above piston wall 26 of platen 16 will be exposed to atmospheric pressure outside of cabin 2. If the aircraft is in flight, this pressure will be less than sea level pressure. The space below piston wall 26, within receptacle 14, will be at the pressure maintained within cabin 2, usually at or near atmospheric pressure at sea level.

Thus there will be a net force on platen 16 upwardly, maintaining it firmly in the position shown in FIG. 2.

Receptacle 14 may be fully or partially removed from its housing 12 and liquid laden refuse accumulated within it.

When it is desired to compact the contents of receptacle 14, it is inserted fully within housing 12, with nipple 34 penetrating valve 44, and the door or other closure (not shown) is closed to seal the inside of compactor 10.

Then a force is applied in any convenient manner, either mechanically or by use of a solenoid, to plunger member 62 overcoming the biasing force exerted by spring 58, and moving body 56 into its second position, shown in FIG. 3.

It will be seen that in this position, with valve 74 open, the space above piston wall 26 is exposed to the pressure within cabin 2 while the space within receptacle 14 below piston wall 26 is now exposed to the lower pressure outside of cabin 2. If the aircraft is flying at an altitude of 36,000 ft., outside pressure is approximately 3.3 psia, and if cabin pressure is maintained at sea level (i.e., 14.7 psia), there is a net downward pressure of 11.4 psia on piston wall 26. If the dimensions of platen 16 are one foot by three feet, then there is a net downward force of $36 \times 12 \times 11.4$ or 4,925 pounds acting. This force is considered more than ample to compact any of the type of refuse expected aboard an airliner. Even if the pressure within the cabin is somewhat less than sea level, there will be adequate force to actuate the compactor.

In addition, it is noted that nipple 34 is located near the bottom of receptacle 14. This makes it possible for much if not most of the liquid present in the refuse to be discharged out of the cabin during compaction thereby further reducing the weight and volume of the refuse to be stored aboard the aircraft until its destination is reached.

A preferred embodiment of this invention incorporating certain additional features is shown in FIGS. 4–9. There is illustrated an airborne refuse compactor 110 comprising a housing 112 with a countertop 114, base 116, and an opening 118 with a hinged door 122.

Figure 5:
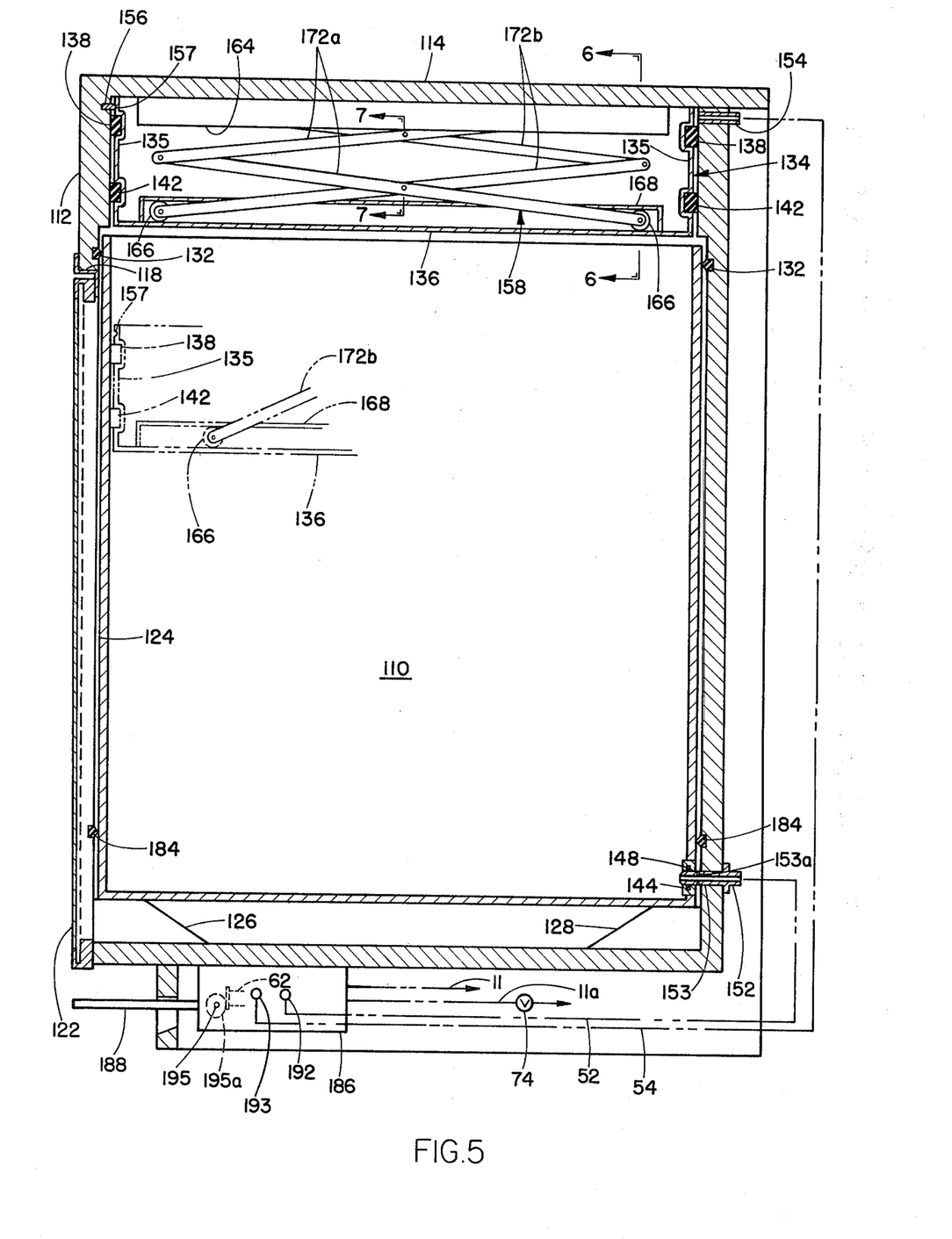
FIG. 5 is an elevation view, in section, of the housing illustrated in FIG. 4 with the refuse receptacle in place, and the door to the housing closed.

As best shown in FIG. 5, a receptacle 124 for the collection of liquid laden refuse is shown within housing 112 ready for compaction. While not illustrated, receptacle 124 would be partially or completely filled with the usual waste products to be found aboard an aircraft, that is paper or plastic cups containing coffee, tea, or other liquid refreshments, napkins, plastic or paper serving pieces, etc.

Figure 4:
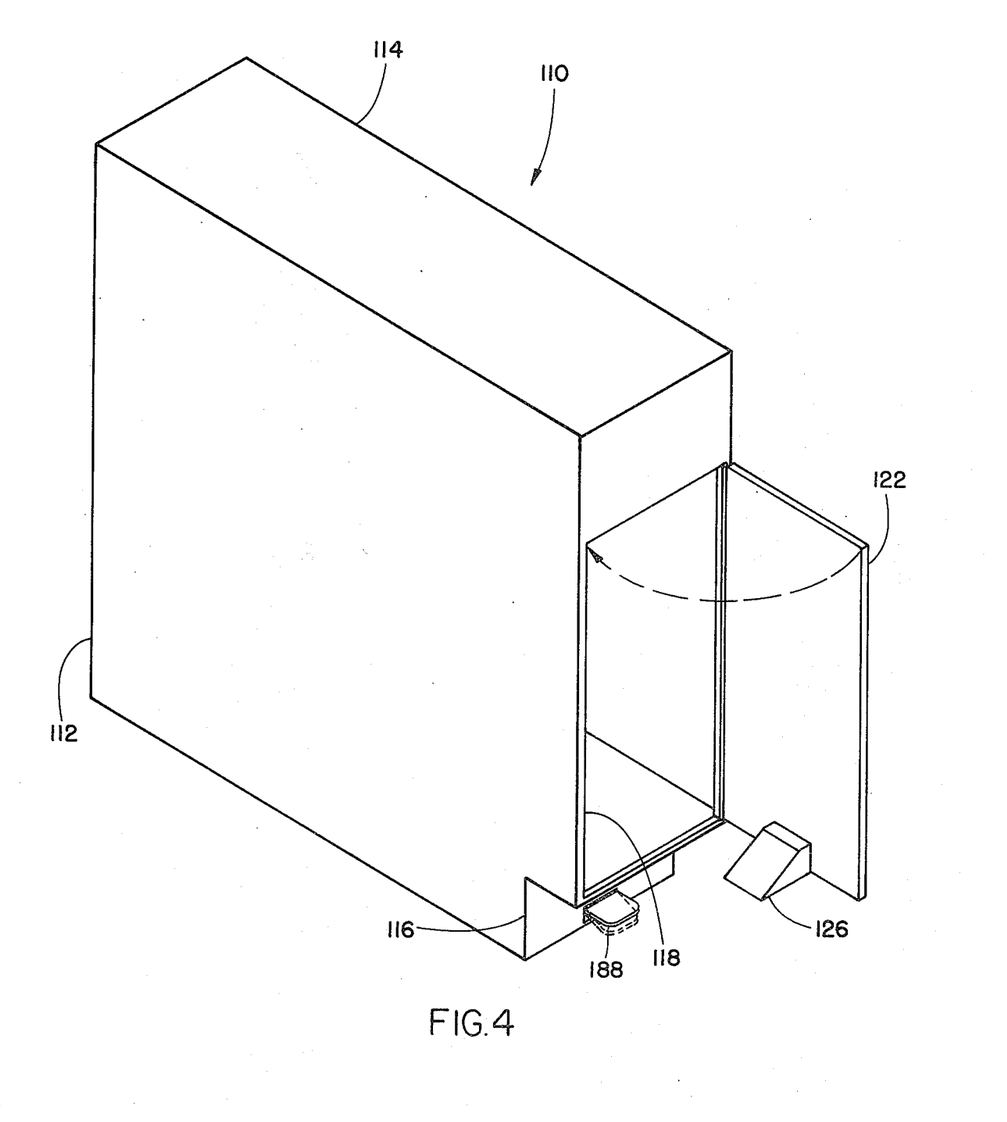
FIG. 4 is an isometric view of the housing for a preferred embodiment of this invention, with the refuse receptacle removed.

Receptacle 124, being rectangular in cross section to conform to the interior of housing 112, sits on and is supported by front and rear cam members 126 and 128, respectively. Cam member 126 is mounted on door 122 as seen in FIG. 4, while cam member 128, extending up to the full width of housing 112, is attached to the rear wall and floor of housing 112. Thus, when receptacle 124 is partially inserted into housing 112, the closing of door 122 pushes receptacle 124 against rear cam member 128, and is lifted by both rear and front cam members 126 and 128. The purpose of this arrangement is to have receptacle 124 come into engagement with a seal or O-ring 132 mounted on the inside of housing 112 along all four walls, above opening 118.

In the space above receptacle 124 there is located platen 134 which is shaped as an open top box with four side walls 135 as illustrated and a bottom piston wall 136. Platen 134 is provided with two sets of peripheral seals or O-rings 138 and 142 mounted in and extending on the outside of all its four side walls 135 to engage the inner surfaces of housing 112 as illustrated. It is seen that the space within housing 112 above receptacle 124 is smaller in cross section by exactly the amount necessary for platen 134 to slide into receptacle 124 where seals 138 and 142 are then in contact with the inner surfaces of receptacle 124, as shown in phantom.

Adjacent the bottom of receptacle 124 there is a self sealing valve 144 which consists of a valve body 146 containing a donut-shaped rubber or similar type material member 148. The opening through the center of member 148 is normally closed, but when receptacle 124 is in place within housing 112 as illustrated in FIG. 5, a nipple 152 mounted on housing 112 having a passageway 153 with one or more side openings 153a extends into the interior of housing 112 and penetrates valve 44 thereby providing communication into receptacle 124. Valve 144 is identical to valve 44 shown in FIGS. 2 and 3.

At some convenient point near the top of housing 112 there is provided through a side wall a hose connector 154 to permit communication with the space above piston wall 136 within platen 134. The upper edge of platen side walls 135 are not sealed against counter 114 and in fact holes may be provided in the side walls of platen 134 above seal 138 to insure good communication with its interior.

A plurality of detents 156 in housing 112 with matching dimples 157 in side walls 135 of platen 134 may be employed to hold the latter in its raised position shown in FIG. 5 when compactor 110 is not operating or when receptacle 124 is out of its housing.

In order to insure that platen 134 stays horizontal, or does not become cocked during movement in and out of receptacle 124, a suitable leveling mechanism may be employed for this purpose.

Figure 6:
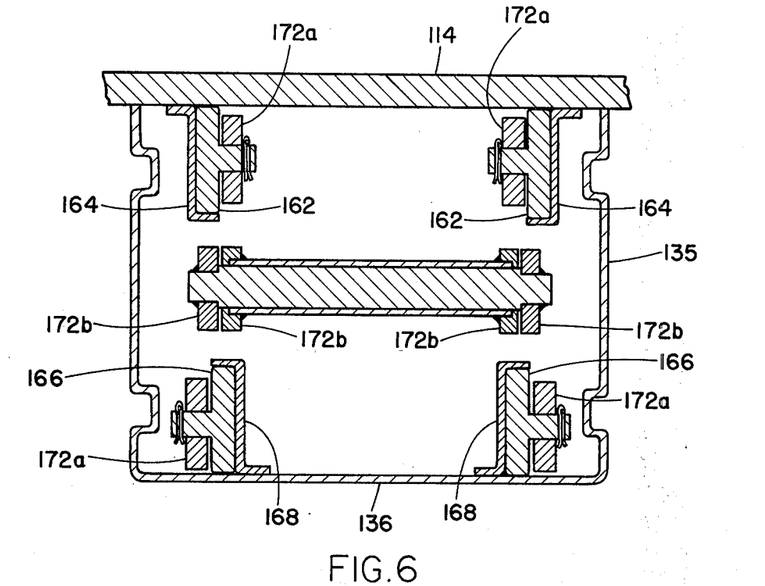
FIG. 6 is a view along 6—6 of FIG. 5.
Figure 7:
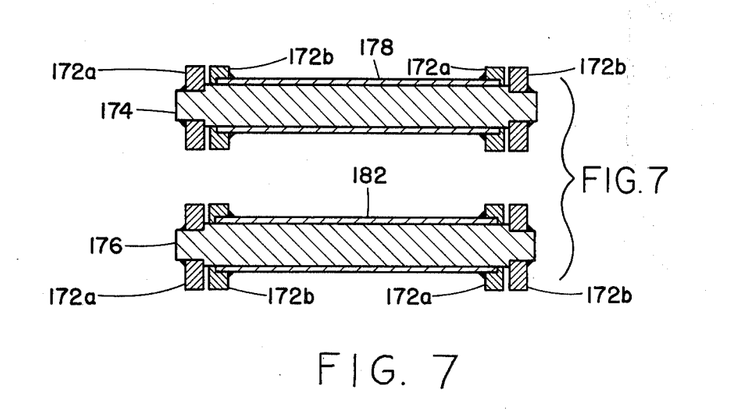
FIG. 7 is a view long 7—7 of FIG. 5.
Figure 8:
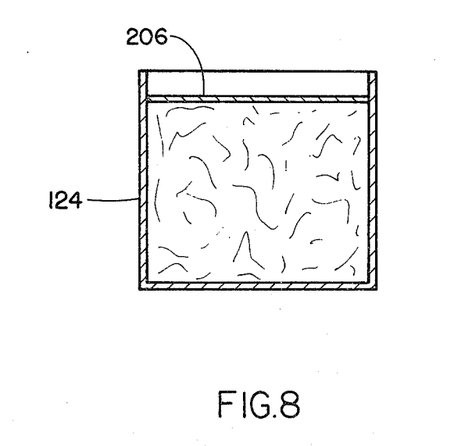
FIG. 8 is a section view of a receptacle with a lid.

Referring to FIGS. 5, 6, and 7, the mechanism provided in this embodiment is a device 158 supported at the upper end by rollers 162 held in tracks 164 on the underside of counter top 114 and at the lower end by rollers 166 held in tracks 168 mounted on the upper side of piston wall 136. Two sets of rod-like scissor members 172a and 172b are pivoted together at their ends and where they cross as illustrated.

As shown in FIG. 7, at crossing points, the two sets of members 172a and 172b are interconnected by shafts 174 and 176 welded or otherwise rigidly attached to members 172a. Sleeves 178 and 182 are rotatable with respect to their shafts 174 and 176, respectively, and are rigidly attached to members 172b. A similar arrangement for the ends of arms 172a and 172b are provided, utilizing, for example a sleeve 183 and a shaft 183a with arms 172b shown in FIG. 6.

By this arrangement it is readily apparent that platen 134 when moving either upwardly or downwardly is always maintained at right angles to the side walls of the housing cavities and the inside of receptacle 124.

Suitable bumpers 184 mounted on the inside of the walls and door 122 of housing 112 help to insure that receptacle 124 remains properly oriented during operation of compactor 110.

Within base 116 of compactor 110 there is suitably mounted a valve assembly 186 with a treadle arm 188 extending out through an opening in front of base 116. Valve assembly 186 consists of the valve 55 shown in FIGS. 2 and 3 movable between a normal or biased position as shown in FIG. 2 and its actuated or depressed position illustrated in FIG. 3. Body 56 slides within the housing of valve assembly 186 with fittings to match up the openings through the body. As shown in FIG. 5, fittings 192 and 193 are shown schematically with hose lines 52 and 54 connected to hose nipple 152 and connector 154, respectively. Treadle 188 is pivoted about a shaft 195 on which is a toggle 195a which upon rotation contacts and actuates plunger member 62 shown in FIGS. 2 and 3.

On the other side of valve assembly 186, not seen, would be two additional fittings (not shown) for connection to hose lines 11 and 11a leading to the inside and outside of cabin 2, respectively, as illustrated in FIGS. 2 and 3. Hose line 22a may be provided with a shut-off valve 74, previously described.

Valve body 56 within valve assembly 186 may be operated mechanically by treadle arm 188 as described or arm 188 may be connected to a switch (not shown) which energizes a solenoid to effect the movement of body 56 as is understood in the art.

The normal position of treadle arm 188 is up with valve body 56 shown in FIG. 2. When arm 188 is depressed (i.e., using a foot), body 56 moves to its position shown in FIG. 3. When the operator's foot is removed from treadle arm 188, the latter will move up, due to a biasing spring in the case of a solenoid or the biasing spring 58 in the case of the purely mechanical linkage illustrated.

It is seen also that the operation just described in effect is fail-safe. When the foot is removed from treadle 188, the latter along with valve body 56 will return to their first or standby position due to the biasing built into the system. Hence, in the event of an accident, for example, where something gets caught in the compactor, such as part of the operator's clothing, removal of the foot from treadle 188 will immediately cancel the compaction cycle.

For sealing receptacle 124 after a series of compactions, a tight fitting lid 206 (see FIG. 8) may be placed on the top of the opening of the former. Receptacle 124 would then be inserted into housing 112 and the lid 206 forced into receptacle 124 through a compaction sequence. In this way, large volumes of refuse will be neatly compacted into small, leakage-proof packages for storage until the end of the flight when they can be removed. Under some circumstances more than one lid may be applied. Due to the tendency of trash to expand somewhat after a compaction step, it may be desirable to apply a lid for each compaction so that the trash receptacle when ready for storage could have two or more lids therein.

In the operation of compactor 110, receptacle 124 would be either partially or completely removed from its housing 112 for the collection of refuse, which as mentioned earlier, is likely to contain substantial amounts of liquid waste. When receptacle 124 becomes filled with such refuse, or nearly so, then it would be shoved completely into its housing 112. During this movement, cams 126 and 128 will raise receptacle 124 as shown in FIG. 5, with nipple 152 entering self-sealing valve 144 and the top of receptacle 124 coming into contact with seal 132. Door 122 is then closed, suitable sealing being provided between the latter and housing 112 surrounding the door opening.

In order to compact the contents of receptacle 124 and remove a substantial portion of the liquid waste present, valve 74 is first opened if it is not already in the open position. Valve body 56 within valve assembly 186 is in its normal position, as shown in FIG. 2 with treadle arm 188 is in its up position (shown in FIG. 5). In this situation, the inside of platen 134 above piston wall 136 is subject to a reduced pressure outside of cabin 2 while the interior of receptacle 124 below piston wall 136 is at cabin pressure with a net upward force on platen 134.

When treadle 188 is depressed to initiate compaction, valve body 56 is moved into its second position (shown in FIG. 3) in which case piston wall 136 has cabin pressure acting downwardly and reduced pressure outside cabin 2 acting upwardly, assuming the aircraft is in flight and the cabin is pressurized.

Under the net unbalanced force acting on it, platen 134 is moved downwardly into receptacle 124 compacting the refuse contained therein. At the same time, liquid which has collected at the bottom of receptacle 124 is sucked out through nipple 152, line 52, to line 11a for discharge into the rarefied atmosphere. It is understood that there may be provided a screen or other device within receptacle 124 surrounding valve 144 to prevent the opening into nipple 152 from being clogged.

The operator, after waiting a few moments to allow for the compaction cycle to be completed (or almost completed), will lift his foot off treadle arm 188 permitting the latter to return to its normal position. Valve body 56 will be returned to its spring biased or first position so that platen 126 will then be subject to a reversal of forces and it will be returned to its position shown in solid lines in FIG. 5, leaving fhe refuse compacted within receptacle 124. If the latter is not full or near full, it can be removed from its housing and more refuse added. Once it is filled, a lid 206 (see FIG. 8), as previously described, would be placed over its opening and a compaction step then employed to fit it in place, sealing the contents and rendering receptacle 124 ready for storage until the end of the flight.

Compactor 110 is constructed of light weight material since there is no part of it which is subject to excessive loads. Receptacle 124 can be constructed of a plastic or cardboard composite material treated for liquid sealing and cheap enough to be discarded with the refuse. Platen 134 could be made of aluminum metal, ribbed in places to accept the two peripheral seals and also provide for greater rigidity and strength, but essentially light in weight. Housing 112 may be constructed of fiberglass with a honeycomb sandwich for minimum weight and maximum strength. Plastic or rubber hoses can be utilized for the peneumatic lines, while valve assembly 186 which would be of suitable high strength and wear resistant metal is relatively small in size and therefore not a heavy unit in spite of its sturdy construction.

It is seen that while the compactor described herein would be quite useful in an airplane with a pressurized cabin, the unit may be suitable for applications where similar trash problems exist such as aboard ships at sea level and even some rail transport where a source of pressurized air may be provided and it is desired to dispose of the liquid content of the refuse. Also, since the device herein disclosed is so simple in construction and extracts the liquid component of the refuse in a manner which is convenient and simple, leaving behind a compacted refuse without or with little liquid remaining, there may be situations where one would supply a compressor or other source of compressed air or other gas in order to take advantage of the many desirable features inherent in this invention.

It is thus seen that while there has been described only certain specific embodiments of this invention, it is understood that many variations thereof are possible without departing from the principles of this invention as defined in the appended claims.

What is claimed is:

1. A refuse compactor for use within the pressurized cabin of an aircraft in flight comprising:
   a. receptacle means for the collection of refuse; and
   b. means actuated by the difference in cabin and outside pressures for compacting said refuse within said receptacle means.

2. The compactor of claim 1 having means to remove liquid present in said refuse during compaction and discharging said liquid outside of said pressurized cabin.

3. The compactor of claim 2 in which said actuated means provides sealing of said receptacle means after compaction is complete by forcefully applying a lid under pressure into said receptacle means.

4. A refuse compactor comprising:
   a. housing means;
   b. refuse receptacle means;
   c. said housing means having a first cavity for receiving and accommodating said receptacle means;
   d. said housing means having a second cavity communicating with said first cavity;
   e. piston means within said second cavity mounted for movement into said refuse receptacle means;
   f. means for sequentially reducing pressure within said housing means between said piston means and said receptacle means thereby effecting movement of said piston means into said receptacle means and compacting refuse therein followed by reversing the pressures acting on said piston means to cause retraction of the latter out of said receptacle means into said first cavity; and
   g. means to withdraw the liquid present in said refuse as compaction is taking place.

5. The compactor of claim 4 in which said liquid withdrawing means is effected by said means for reducing pressure within said housing means on the said piston means to cause compaction.

6. The refuse compactor of either claims 4 or 5 in which said housing means is made of fiberglass material and is of a honeycomb sandwich construction.

7. A refuse compactor comprising:
   a. housing means of fiberglass material and honeycomb sandwich construction;
   b. refuse receptacle means;
   c. said housing means having a first cavity for receiving and accommodating said receptacle means;
   d. said housing means having a second cavity communicating with said first cavity;
   e. piston means within said second cavity mounted for movement into said refuse receptacle means; and
   f. means for sequentially reducing pressure within said housing means between said piston means and said receptacle means thereby effecting movement of said piston means into said receptacle means and compacting refuse therein followed by reversing the pressures acting on said piston means to cause retraction of the latter out of said receptacle means into said first cavity.

8. A refuse compactor comprising:
   a. housing means;
   b. refuse receptacle means;
   c. said housing means having a first cavity for receiving and accommodating said receptacle means;
   d. said housing means having a second cavity communicating with said first cavity;
   e. piston means within said second cavity mounted for movement into said refuse receptacle means;
   f. means for sequentially reducing pressure within said housing means between said piston means and said receptacle means thereby effecting movement of said piston means into said receptacle means and compacting refuse therein followed by reversing the pressures acting on said piston means to cause retraction of the latter out of said receptacle means into said first cavity; and
   g. said receptable means being open at the top thereof for accommodating said piston means, said housing means having a side opening for the insertion and removal of said receptacle means, means for closing and sealing said opening, means for raising said receptacle means as said opening is closed, and means for sealing the periphery of said receptacle means above said opening against said housing means to maintain unbalanced pressure on said piston means during compaction and withdrawal.

9. The compactor of claim 8 in which said means for sequentially reducing pressure includes means to penetrate said receptacle means as the latter is inserted into said housing means for effecting pressure changes within said receptacle means below said piston means, and said receptacle means is provided adjacent the bottom thereof a normally closed valve means for accommodating the aforesaid means to penetrate, the liquid in said refuse within said receptacle means being withdrawn through said valve means when pressure within said receptacle means is lowered to cause compaction of said refuse.

10. The compactor of either claims 4, 5, 8 or 9 in which said housing means is located within the pressurized cabin of an aircraft in flight and said means for sequentially reducing pressure comprises means to expose in turn each side of said piston means to atmospheric pressure outside of said pressurized cabin to cause compaction of said refuse and then retraction of said piston means.

11. A refuse compactor comprising:
   a. housing means;
   b. refuse receptacle means;
   c. said housing means having a first cavity for receiving and accommodating said receptacle means;
   d. said housing means having a second cavity communicating with said first cavity;
   e. piston means within said second cavity mounted for movement into said refuse receptacle means;
   f. means for sequentially reducing pressure within said housing means between said piston means and said receptacle means thereby effecting movement of said piston means into said receptacle means and compacting refuse therein followed by reversing the pressures acting on said piston means to cause retraction of the latter out of said receptacle means into said first cavity; and
   g. said housing means being located within the pressurized cabin of an aircraft in flight and said means for sequentially reducing pressure comprises means to expose in turn each side of said piston means to atmospheric pressure outside of said pressurized cabin to cause compaction of said refuse and then retraction of said piston means.

* * * * *